June 28, 1966  G. H. ROACH  3,258,514

HOT PRESSING OF POWDERED REFRACTORY MATERIAL

Filed Feb. 2, 1962  2 Sheets-Sheet 1

INVENTOR.
GEORGE H. ROACH
BY

INVENTOR.
GEORGE H. ROACH

United States Patent Office 3,258,514
Patented June 28, 1966

3,258,514
HOT PRESSING OF POWDERED REFRACTORY MATERIAL
George H. Roach, Santa Clara, Calif., assignor to Kaiser Aluminum & Chemical Corporation, Oakland, Calif., a corporation of Delaware
Filed Feb. 2, 1962, Ser. No. 170,724
8 Claims. (Cl. 264—125)

This invention relates to an improved method for the fabrication of articles from powdered materials. More particularly, the invention relates to a new and improved method for hot pressing and fabricating articles from powdered material.

In recent years there has been an increasing demand in industrial and research applications for materials that would withstand severe conditions, such as high temperature, oxidizing and other corrosive conditions, etc., more satisfactorily than conventional materials. Considerable research effort has been devoted to producing materials of good high temperature properties, as well as high strength. Many super refractory materials, such as the refractory hard metals, refractory oxides and cermets, have been developed for high temperature service which may additionally require high strength properties, resistance to corrosive and oxidizing conditions and resistance to thermal shock. Improved metal and alloy shapes, produced by powder metallurgical techniques, have been developed and these now find use in applications where the environments are such as to render the same metals and alloys in the cast or wrought states totally unsuitable.

The expression "refractory hard metals" is one commonly known in the art; it refers to high melting hard substances of a metallic nature which are, however, technically inorganic compounds. "Refractory hard metal" materials include the refractory carbides, borides, nitrides and silicides of metals in the fourth to sixth groups of the periodic chart. Among the more important materials of this type are the carbides and borides of titanium, zirconium, niobium, tantalum and mixtures thereof.

The term "cermets" is generally used to denote an aggregate type of material composed of metals and ceramics having properties in an intermediate range between the basic constituents. "Refractory oxides" includes ceramic materials such as beryllia, magnesia, zirconia and alumina.

The fabrication of these materials into the desired shapes has been by powder metallurgical techniques, such as (1) slip casting, extruding or cold pressing followed by firing or sintering or (2) hot pressing wherein the compacting and pressing is accomplished simultaneously with the firing or sintering step. It is the hot pressing technique to which this invention is directed.

In many applications the fabricated body or shape must have high strength and hardness properties, which properties depend largely upon the degree of porosity in the sintered body. Hot pressing can produce a dense body, pressed to size without warpage and shrinkage from heating. Cavities, formed by bridging of powders during the pressing operations, are minimized by the elevated temperatures and pressures used in hot pressing. Consequently, hot pressing is frequently employed where the fabricated body must meet certain requirements of strength and hardness.

In hot pressing, powdered material is introduced into a mold cavity which is equipped with pressure applying means. The pressure may be applied by a variety of means; however, hydraulic or pneumatic rams are usually preferred because of adjustability and ease of control. The hot pressing furnace may be either of a horizontal type or of a vertical type. Two types of electrical heating are commonly used in hot pressing furnaces, namely, resistance heating and high-frequency induction heating. In the hot pressing technique heretofore and currently practiced, the furnace is loaded with the powdered material and then pressure and heat from the electrical heating means are simultaneously applied. During the heating up of the charge in the mold or die, pressure is gradually applied to the powder until the full molding pressure is attained. The heating period (heating of the furnace die and charge) requires a relatively substantial amount of time, for example, one hour to three hours in the usual case, depending on the size of the furnace. After the required temperature is attained, the powder is maintained at the sintering temperature for a considerable period of time ranging up to one hour. After sintering, the article is kept in the furnace for a cooling down period. This may also range up to several hours. In many instances the capacity of a hot press would be limited to one pressing per 8-hour shift. A large part of the time is involved in heating up and cooling down, where the use of pressure is not essential to the production of quality bodies or shapes. This represents a waste of productive capacity as the press is tied up whether or not it is exerting pressure. The present invention provides a method for hot pressing articles at a considerably increased rate thereby reducing the production cost of hot pressed articles.

Other features and advantages of the invention may become apparent from the ensuing description and drawings which are shown by way of example, and the invention is not to be construed as being limiting thereto.

The present invention provides an improved method for increasing the productive capacity of hot pressing furnaces including the steps of charging powdered material into an open end elongated container having internal dimensions of the shape desired to be produced, and of a size and configuration to fit into the furnace die, loading the charged container into the die which has been heated to substantially the preselected sintering temperature, subjecting the powdered material to pressure while heating the material to the sintering temperature, maintaining the material at the pressure and the sintering temperature for a time sufficient to obtain a solid, compacted shape or body, removing the container and sintered shape from the die while loading another charged container into said die. Additionally, the invention includes the steps of charging the powdered material into a container which has its internal surfaces lubricated with a suitable lubricant and preheating the container and the powdered material to a temperature below the sintering temperature in order to volatilize the volatile constituents in the lubricant. Also, the sintered shapes may be cooled in a protected, insulated zone. The invention further contemplates the simultaneous and/or successive sintering of a plurality of shapes of hot pressed shapes in a single hot press furnace.

The accompanying drawings illustrate a suitable exemplary hot pressing apparatus for carrying out the instant invention.

Figure 1:
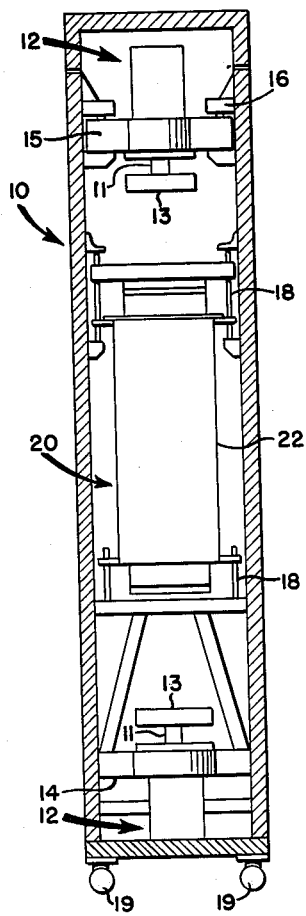
FIG. 1 is a front elevation view partly in section showing a vertically positioned hot pressing furnace.

The apparatus as shown in FIG. 1 is of a vertically positioned hot press which is suitable for carrying out the invention, however, it is not to be construed that the invention is limited thereto. The apparatus in FIG. 1 generally consists of several components including a frame supporting structure 10, a furnace assembly 20, and co-acting hydraulic pressure transmitting means 12. The frame structure 10, preferably of steel, is vertically positioned and supports the principal operating components. Two double-acting hydraulic cylinder assemblies 12, one at the top and one at the bottom of the frame structure 10, are mounted on a coincident center line. Each hydraulic cylinder assembly 12 comprises extendable piston rod 11 to which piston rod platform 13 is affixedly attached. The furnace assembly 20 is mounted on the frame 10 between the hydraulic cylinders and coincident with their center line. The furnace assembly contains the die in which the hot pressing is performed. The lower hydraulic cylinder assembly is mounted on a bridge 14 which is an integral part of frame 10. The upper hydraulic cylinder assembly is mounted on a bridge 15 which may be stationary or, alternatively, hinged to frame bracket 10 so as to be capable of rotating out of the way for access to the top of the furnace 20. Furnace 20 is supported by the frame structure 10, and is held in position at the top and bottom by pins and bracket assemblies 18 suitably attached, such as by welding, to the frame 10. The frame supporting structure 10 may be fixedly placed or it may be provided with casters, such as casters 19, for ease of movement when disassembly is necessary.

Figure 2:
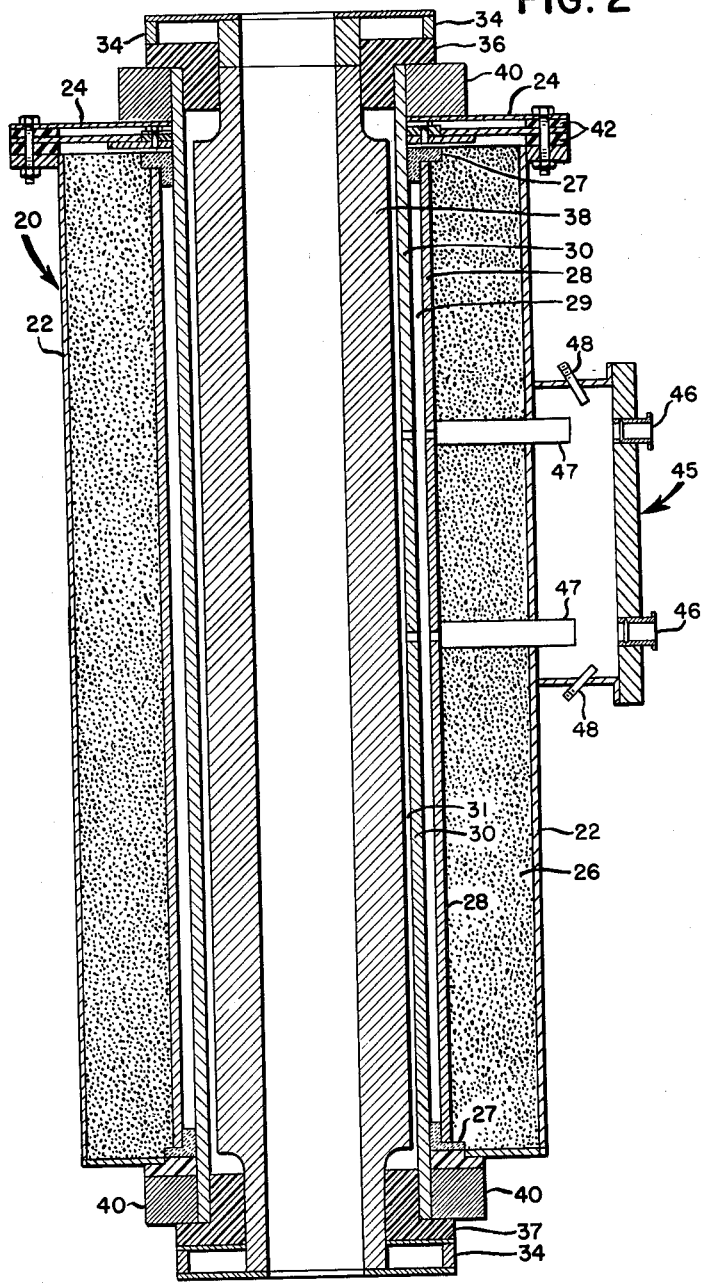
FIG. 2 is a longitudinal, cross-sectional view of the furnace assembly of the apparatus shown in FIG. 1.

The furnace assembly 20 is shown in more detail in FIG. 2 and comprises a shell 22, which preferably is of steel, with lid or cover plate 24, and contains lampblack insulation 26 immediately within. The lampblack insulation 26 extends inwardly to a graphite sheave 28 which is spaced from the resistor heating tube 30, also of graphite, by ceramic rings 27, leaving insulating gas space 29. The heating tube 30 is electrically connected to power supplying terminal blocks 40 and is insulated from the steel lid or cover plate 24 by discs 42 of any suitable insulating material. The heating tube 30 is electrically insulated from the die 38 at the top and bottom by packing flanges 36 and 37, respectively, which are composed of any suitable insulating material. Water-cooled copper rings 34 are installed in contact with each end of the die to maintain these ends below oxidation temperature during the hot pressing cycle. Good contact for thermal conductivity is assured since the lower rings support the weight of the die and the upper copper ring is held in contact by a spring loaded plate, not shown.

Access for making optical pyrometric measurements is provided through sight assembly 45, which is hermetically attached to the furnace shell surface. The assembly contains glass ports 46 for viewing in the sight tubes 47. Sight tubes 47, which may be of graphite, extend through openings in the shell 22, and are axially disposed with openings in the sheath and heater tube for viewing the graphite die and to provide access to gas spaces 29 and 31. Gas space 31 comprises the area between the graphite die 38 and heater tube 30. Purge gas entry ports 48 are provided in the sight assembly as a convenient means for introducing purge gas into the furnace assembly. The gas after entering through the inlets 48 passes through sight tubes 47 into the gas space zones 29 and 31. Openings are provided in the steel lid or cover plate 24 as exits for the purge gas circulating through the hot pressing furnace assembly. The function of the purge gas system is to maintain the interior of the furnace assembly free of reactive gases during the hot pressing operation. The purge gas can be of any suitable nonreactive gas, such as argon or nitrogen.

The force required for pressing the powder into solid fabricated shapes is obtained from a hydraulic system which includes a hydraulic pump, not shown in the drawings, and which actuates the hydraulic cylinder assemblies 12.

Figure 3:
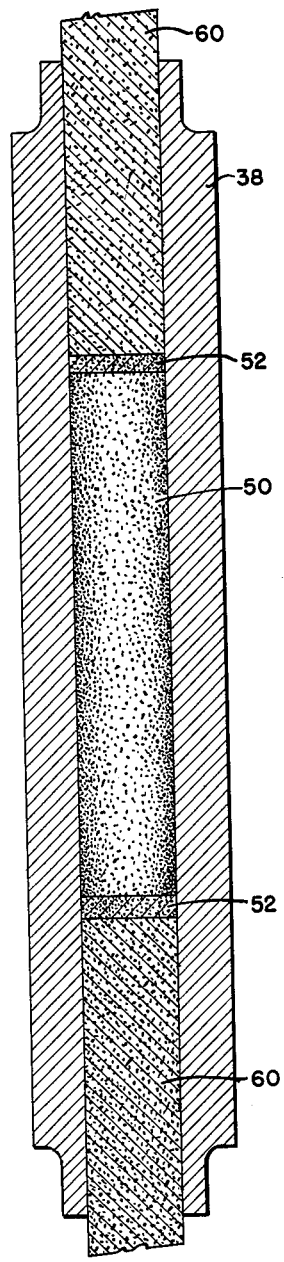
FIG. 3 is a cross-sectional view of the furnace die and depicts the conventional method of loading or charging the die for hot pressing.

FIG. 3 depicts the charging of a die for operating the hot press in the conventional manner. In FIG. 3 there is shown furnace die 38 with the powder charge 50 disposed therein and graphite pads 52 placed within die 38 at either end of powder charge 50. The powder charge 50 and graphite pads 52 may be placed in die 38 either when the die is removed from furnace assembly 20 or when the die is in place in the furnace assembly 20. In the pressing operation graphite plungers 60 transmit pressure from the hydraulic cylinder assemblies 12 to the powder charge through the graphite pads 52. Plungers 60 may be fixedly attached to the platforms 13 of the hydraulic cylinder assemblies 12, or they may be separate unattached members. In conventional hot pressing the entire heating of the powder to sintering temperature and the cooling down of the finished shaped body is done in the press. Consequently, there is a waste of productive capacity, as the press is tied up whether or not it is exerting pressure.

The present invention discloses techniques for hot pressing of fabricated shapes on either a semicontinuous or continuous basis.

Figure 4:
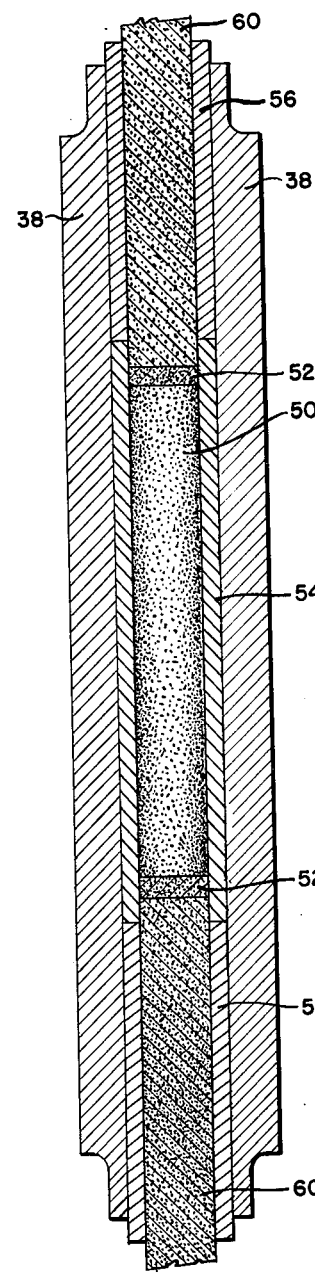
FIG. 4 is a cross-sectional view of the furnace die and depicts one embodiment of the instant invention for loading or charging the die.

In FIG. 4 there is shown one embodiment of the invention wherein the hot pressing is accomplished on a semicontinuous basis. In this embodiment, additional dies, i.e., sleeve dies 54, are used to contain the powder charge. The outside configuration of sleeve dies 54 are shaped to fit closely within the hot press die 38, which thus becomes the "mother die." Prior to charging the internal surfaces of sleeve dies 54 are lubricated with a suitable lubricant, such as a mixture of petroleum jelly and powdered graphite. Sleeve dies 54 are filled with the powder charge outside the hot press and cold compaction can be achieved either by vibrating or pressing. Pads 52 of a suitable material, such as graphite, are placed at either end of the powder charge to hold the compacted powder in place and to protect the powder charge from contamination. (The charged sleeve die 54 may be preheated, if desired, in an auxiliary furnace or oven, not shown. With certain materials, such as the refractory hard metal materials, it has been found that lubricating the internal surfaces of the sleeve dies prior to charging powder is desirable. A suitable lubricant, such as a mixture of petroleum jelly and powdered graphite, has been found satisfactory. When a lubricant is used, a preheating before loading into the furnace die is necessary in order to evaporate the volatile constituents of the lubricant.) The charged sleeve die 54 is loaded into die 38 which is at substantially the sintering temperature. Desirably, the loading of the charged sleeve die into the furnace die is done under a protective atmosphere, such as an atmosphere of argon or nitrogen, in order to protect both the furnace die and the powder charge from oxidation. The sleeve die 54, as shown in FIG. 4, does not ordinarily fill the entire die 38 of the hot press, therefore, sleeve die spacers 56 of essentially the same internal and external surface configurations of the sleeve die 54 are used so that the sleeve die 54 is properly positioned in the hot press. Pressure is transmitted from the hydraulic cylinder assemblies 12 to plungers 60. The plungers 60 pass through the spacer dies 56 and into sleeve die 54 where they push against the graphite pads 52. When the desired temperature and degree of compaction of the powder are achieved, removal of the sleeve die 54 containing the pressed body is removed. The sleeve die 54 is removed from the furnace at one end as a new charged sleeve die can be placed in the furnace at the other end. The removed sleeve die and pressed shape is then immediately placed in an insulated container for cooling. A new charged sleeve die is centered in the furnace by adding a sleeve die spacer and leaving a sleeve die spacer from the previous pressing, the plungers are placed in operating position, and pressing resumed. This sequence of operations is repeated, following each pressing.

Figure 5:
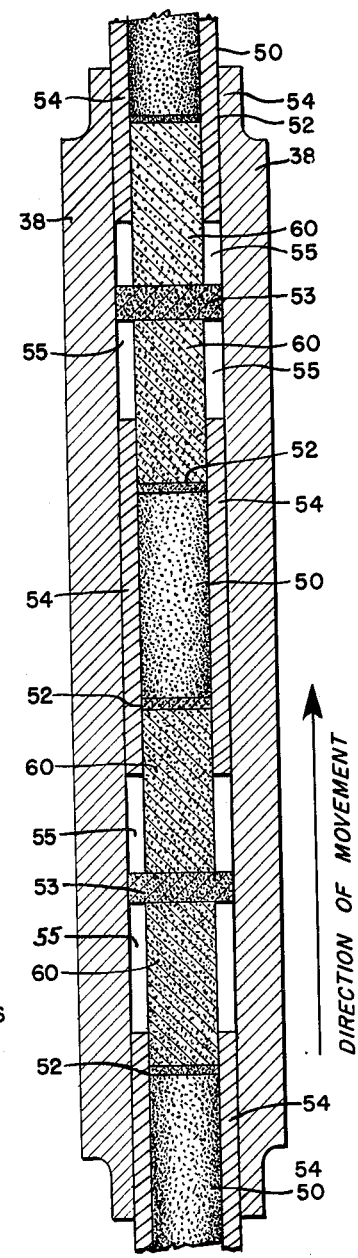
FIG. 5 depicts a second embodiment for carrying out the instant invention.

FIG. 5 depicts a further embodiment of the invention, a technique for continuous hot pressing of shapes. In this continuous embodiment a plurality of powder charges are in the furnace at the same time. FIG. 5 shows powder charges 50 disposed in sleeve dies 54 and having graphite pads 52 in position at either end of the powder charges 50. As shown in FIG. 5, powder charges 50 are loaded in furnace die 38 and graphite pads 52 of adjacent sleeve dies 54 and powder charges 50 are separated by two graphite plungers 60 having a spacer pad 53 therebetween. This leaves spaces 55 between adjacent sleeve dies 54 thereby preventing breakage of sleeve dies during pressing. During the pressing operation the plungers 60 which extend from either end of furnace die 38 are in contact with and transmit the pressure from hydraulic cylinder assemblies 12. As in the embodiment shown in FIG. 4, the charged sleeve dies may be preheated, if desired, in an auxiliary furnace or oven prior to being placed in the hot press furnace. A charged sleeve die is placed into the furnace die 38 in the hot press furnace and by suitable operation of the hydraulic cylinder assemblies 12 the charged sleeve die moves through the furnace under pressure, the pressure being released as required to add additional charged sleeve dies, and the rate of movement held to that which will give a suitable cycle to the shape being pressed. Sleeve dies containing the finished shapes are removed from the end of the furnace opposite the feed end, and cooled in an insulated container to minimize air burn of the graphite parts. In FIG. 5, the movement of the charged sleeve dies is upward in the direction of the arrow, and the stage of operation shown therein is a sleeve die and finished shape being expelled from the top (exit) of furnace die 38.

In operation of the semicontinuous and continuous hot pressing techniqus shown in FIGS. 4 and 5, respectively, the feed end of the furnace die 38 may be either the top or the bottom in which case the sleeve dies and finished shapes are removed from either the bottom or the top of the furnace die, as the case may be.

Series of hot pressings performed according to the semicontinuous and the continuous hot pressing techniques, described above in relation to FIGS. 4 and 5, respectively, have been performed on various powder materials including silicon carbide (SiC), titanium diboride (TiB₂), mixtures of titanium diboride and titanium carbide (TiB₂+TiC) and alumina (Al₂O₃), copper-titanium diboride cermet (Cu-TiB₂) and boron nitride (BN). In these pressings, the shortened time that the powder is in the hot press certainly points out the important economic advantage of the semicontinuous and continuous techniques of the invention. However, an additional unexpected advantage is obtained. The pressed shapes made according to the invention have a high modulus of rupture, considerably higher (15 to 20% or more) than that of shapes of the same composition hot pressed in the conventional manner and of the same density. A possible explanation for this is that the lower retention time in the hot press in the techniques of the invention prevents or substantially eliminates the growth of crystallites or grains which would form planes of weakness. These advantages are shown in the following examples.

*Example A*

Ten rods of a circular cross-section and having dimensions of 1⅛ inch diameter by 4 inch length were produced in the semicontinuous technique depicted in FIG. 4. The internal surfaces of the sleeve dies were lubricated with petroleum and graphite, and the sleeve dies were then loaded with powder consisting of 20% TiC–80% TiB₂ and preheated in an oven to 450° C. (The preheat temperature may be as high as the sintering temperature; however, it has been found that lower temperatures will be satisfactory. In most instances a preheat temperature of 300 to 500° C. will be adequate.) The charged sleeve dies were loaded into a hot press furnace in the manner described above for the semicontinuous hot pressing technique. The charged sleeve dies were in the furnace a total of 35 minutes, 10 minutes of this being pressing at the sintering temperature, 2000° C. The rods had the following typical properties:

Density—100% of theoretical density.
Modulus of rupture—60,000 p.s.i.

In this example the modulus of rupture is substantially higher than the modulus of rupture (on the order of 45,000 p.s.i.) of articles of the same composition hot pressed in the conventional batch manner.

*Example B*

Eight titanium diboride (TiB₂) rods of the same size as those of Example A were produced by the same semicontinuous technique, described above in Example A. Typical properties of these rods were as follows:

Density—96.9% of theoretical density.
Modulus of rupture—42,000 p.s.i.
Specific resistivity—13 microhms-cm.

(The modulus of rupture of TiB₂ articles hot pressed in the conventional batch manner is about 28,000 to 32,000 p.s.i.)

*Example C*

Twelve copper cermet rods, 2 inches diameter by 8 inches long, were produced by the semicontinuous technique at the rate of four per hour. The composition of the powder was in the ratio of 350 g. of powdered Cu to 1560 g. of powdered TiB₂. The internal surfaces of the sleeve dies were not lubricated, and no preheating step was employed. A sintering temperature of 1800 to 1900° C. was used during the run. The finished rods had the following properties:

Modulus of rupture—22,650 p.s.i.
Specific resistivity—9 microhm-cm.

*Example D*

Twenty-five rods of the dimensions 1⅛ inches diameter and 4 inches in length were made by the continuous hot pressing technique described in conjunction with FIG. 5, using 80% TiB₂—20% TiC powder. The sleeve dies were lubricated with petrolatum and graphite, loaded with powder and then preheated in an oven to 450° C. In the hot pressing operation the sintering temperature was 2000° C. A finished shape was ejected from the furnace at the rate of one every 5 minutes (12 per hour or 72 per 8 hour shift). The typical properties of the rods (the average of 5 rods) were:

Density—94.2% theoretical density.
Modulus of rupture—55,000 p.s.i.
Specific resistivity—20.3 microhm-cm.

(As noted in Example A, the modulus of rupture of articles of 80% TiB₂—20% TiC hot pressed in the conventional batch method is on the order of 45,000 p.s.i.)

*Example E*

Twenty crucibles of the composition 80% TiB₂—20% TiC and of a diameter of 2 inches and a depth of 2 inches were made by the continuous hot pressing technique. The conditions of preheating and sintering were similar to those in Example D except that the material was held at the sintering temperature longer. The rate of production in this example was one crucible every twenty minutes (this would be at the rate of twenty-four pieces per 8 hours). The crucibles had a density of 99.7% of the theoretical density.

Various materials have been tested in the continuous hot pressing technique. Alumina (Al₂O₃) rods of 1⅛ inches diameter and 4 inches length have been hot pressed at a sintering temperature of 1500° C., and a density of 98% of theoretical density has been obtained. Also, boron nitride rods of the same size have exhibited densities of (1) 91% of theoretical when sintered at 1600° C. and (2) 97.7% of theoretical when sintered at 1700° C.

Although the examples above relate to making rods and crucibles, the semicontinuous and continuous hot pressing techniques of the invention are not limited to these shapes. Many other shapes, nozzles and pipes for example, may be made by either the semicontinuous or continuous hot pressing techniques. It is apparent that various changes and modifications may be made without departing from the spirit and scope of the invention, the invention being limited only as defined in the following claims wherein what is claimed is:

1. In the method of hot pressing powdered refractory material into fabricated shapes wherein powdered refractory material is charged into an open end elongated die, heated to a preselected sintering temperature and subjected while at said sintering temperature to the application of pressure for a time sufficient to mold and compact the powder mass into a solid shape, the improvement comprising the steps of charging powdered refractory material into an elongated container having openings at both ends and having internal dimensions of the desired shape and being of a size and configuration to fit into the die, loading the charged container into the die which has been heated to substantially the preselected sintering temperature, subjecting the powdered refractory material to pressure without deforming the container while heating the material to the sintering temperature, maintaining the material at the pressure and the sintering temperature for a time sufficient to obtain a solid compacted shape having a high modulus of rupture, removing said container and sintered shape from said die while loading another charged container into said heated die.

2. A method according to claim 1 wherein the container and sintered shape removed from the die are placed for cooling in an atmosphere which will protect against oxidation.

3. A method according to claim 1 wherein the powdered material of at least two containers charged to the die is subjected to sintering simultaneously.

4. A method according to claim 3 wherein the sintering of the powdered material in adjacent containers within the die is accomplished in a successive manner.

5. In the method of hot pressing powdered refractory hard metal material into fabricated shapes wherein powdered refractory hard metal material is charged into an open end elongated die, heated to a preselected sintering temperature and subjected while at said sintering temperature to the application of pressure for a time sufficient to mold and compact the powdered mass into a solid shape, the improvement comprising the steps of charging powdered refractory hard metal material into an elongated container having openings at both ends and having internal dimensions of the desired shape and being of a size and configuration to fit into the die, the internal surfaces of said container being lubricated prior to charging of the powdered refractory hard metal material, preheating the container and the powdered refractory hard metal material to a temperature below the sintering temperture, loading the charged container into the die which has been heated to substantially the preselected sintering temperature, subjecting the powdered refractory hard metal material to pressure without deforming the container while heating the material to the sintering temperature, maintaining the pressure and the sintering temperature for a time sufficient to obtain a solid compacted shape having a high modulus of rupture, removing said container and sintered body from said die while loading another charged container into said heated die.

6. A method according to claim 5 wherein the container and sintered shape removed from the die are placed for cooling in an atmosphere which will protect against oxidation.

7. A method according to claim 5 wherein the powdered material of at least two containers charged to the die are subjected to sintering simultaneously.

8. A method according to claim 7 wherein the sintering of the powdered material in adjacent containers within the die is accomplished in a successive manner.

References Cited by the Examiner

UNITED STATES PATENTS

| 2,097,502 | 11/1937 | Southgate | 18—59.3 XR |
| 2,123,416 | 7/1938 | Graham | 18—59.2 XR |
| 2,964,400 | 12/1960 | Brennan | 18—59.2 XR |

FOREIGN PATENTS 719,611 12/1954 Great Britain.

ALEXANDER H. BRODMERKEL, *Primary Examiner.*

WILLIAM J. STEPHENSON, *Examiner.*

P. E. ANDERSON, *Assistant Examiner.*